United States Patent
Dias et al.

(10) Patent No.: US 9,800,440 B1
(45) Date of Patent: Oct. 24, 2017

(54) TRANSMITTER (TX) DEAD-TIME MODULATION

(71) Applicant: Intel IP Corporation, Santa Clara, CA (US)

(72) Inventors: Victor Da Fonte Dias, Neubiberg (DE); Giuseppe Li Puma, Bochum (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/195,167

(22) Filed: Jun. 28, 2016

(51) Int. Cl.
*H04L 27/34* (2006.01)
*H04L 25/49* (2006.01)
*H04L 27/20* (2006.01)

(52) U.S. Cl.
CPC .......... *H04L 25/4921* (2013.01); *H04L 27/20* (2013.01)

(58) Field of Classification Search
USPC .............. 375/298, 296, 322, 260; 370/338
See application file for complete search history.

(56) References Cited

U.S. PATENT DOCUMENTS

| | | | | |
|---|---|---|---|---|
| 6,259,747 B1* | 7/2001 | Gustafsson | ......... | H04L 27/2071 332/103 |
| 7,817,733 B2* | 10/2010 | Carsello | .............. | H04L 27/2624 370/203 |
| 9,565,043 B1* | 2/2017 | Li Puma | ............. | H04L 27/2032 |
| 2003/0215030 A1* | 11/2003 | Hurley | ................... | H04B 1/707 375/322 |
| 2012/0062331 A1 | 3/2012 | Ravi et al. | | |
| 2014/0002288 A1 | 1/2014 | Scholz | | |
| 2015/0365113 A1* | 12/2015 | Menkhoff | ............. | H04L 27/361 375/296 |
| 2016/0182262 A1* | 6/2016 | Leistner | .................. | G06F 1/025 370/338 |
| 2016/0323091 A1* | 11/2016 | Inoue | ..................... | H04L 27/38 |

OTHER PUBLICATIONS

Ravi, Ashoke et al. "A 2.5GHz delay-based wideband OFDM outphasing modulator in 45nm-LP CMOS." 2011 Symposium on VLSI Circuits Digest of Technical Papers, pp. 26-27.
Hetzel., S.A. "A LINC Transmitter," 1991 IEEE. pp. 133-137.
Nash, Eamon, "Correcting Imperfections in IQ Modulators to Improve RF Signal Fidelity." AN-1039 Application Note, www.analog.com, pp. 1-8.
Zimmermann, Niklas. "Design and Implementation of a Broadband RF-DAC Transmitter for Wireless Communications." Dissertation, Jul. 1, 2011. 171 Pages.

* cited by examiner

*Primary Examiner* — Eva Puente
(74) *Attorney, Agent, or Firm* — Eschweiler & Potashnik, LLC

(57) ABSTRACT

A transmitter comprising a phase computation circuit configured to receive a complex baseband signal comprising an in-phase signal and a quadrature signal forming an I-Q data pair, and determine a first rotation angle and a second rotation angle based on the I-Q data pair. The transmitter further comprises a modulation circuit coupled to the phase computation circuit configured to determine a three-level modulated waveform having a lower negative level, a zero level and a higher positive level, based on the first rotation angle and the second rotation angle; and generate the three-level modulated waveform based on the determination.

25 Claims, 8 Drawing Sheets

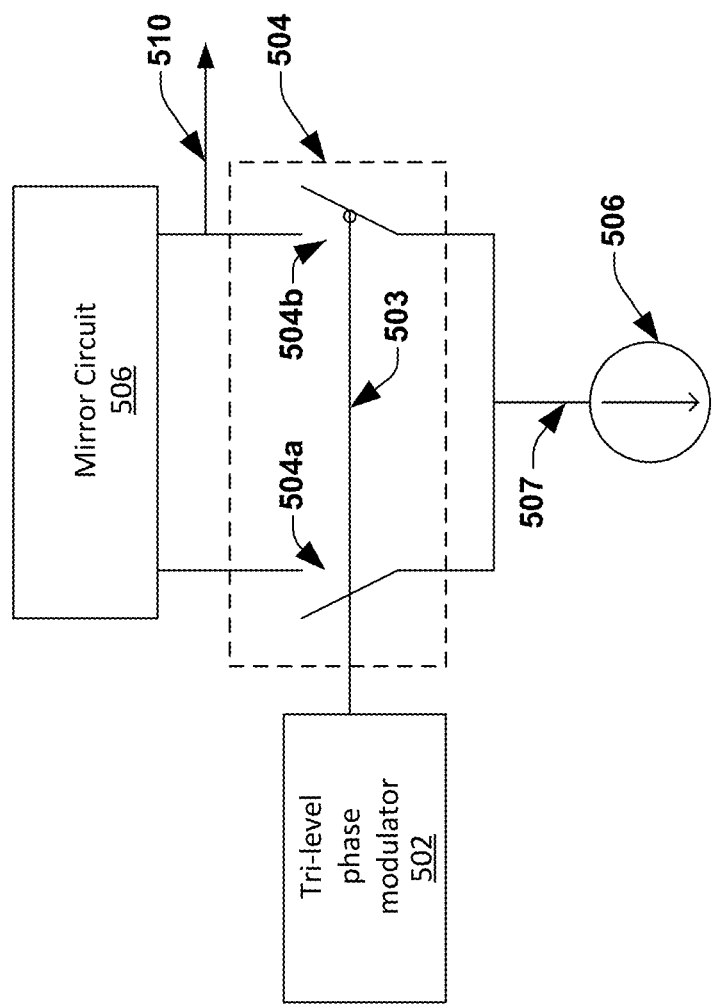

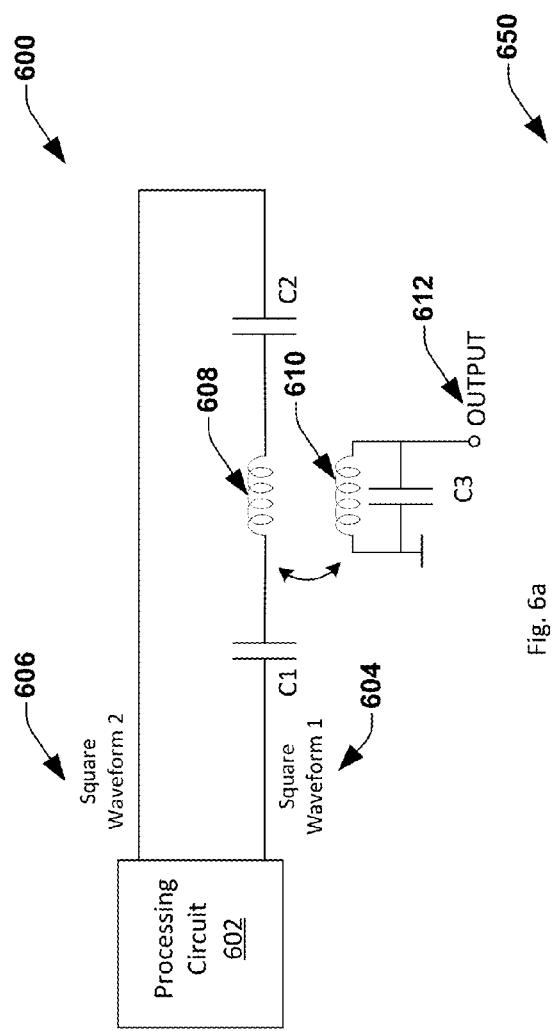
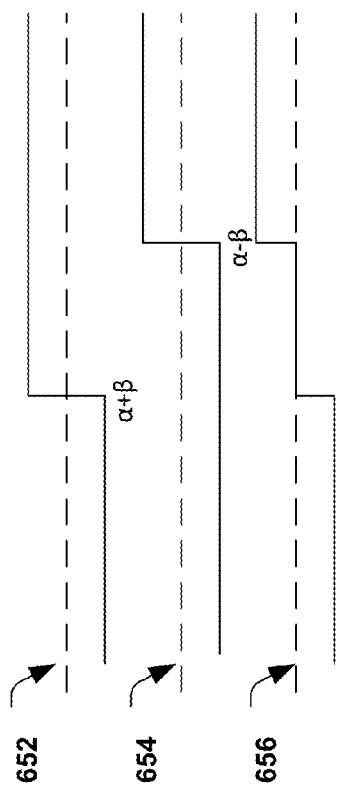

TRANSMITTER (TX) DEAD-TIME MODULATION

FIELD

The present disclosure relates to a modulation scheme in wireless transmitters and, in particular to an apparatus and a method for implementing the modulation scheme in wireless transmitters.

BACKGROUND

Since new applications and upcoming standards require increasing data rates and lower power consumption, the study and development of new architectures of communication transmitters for user units is very active. In modern wireless digital communication standards (cellular, connectivity, etc.) the baseband signal to be transmitted has a complex nature. In these standards each sample of the signal to be transmitted is equivalent to the coordinates of a point in a two dimensional plane. Consequently, the alternative transmitter architectures used in practice correspond to alternative ways of expressing the point coordinates, namely in Cartesian coordinates, or in Polar coordinates, or as a combination of Cartesian and polar coordinates, or as a sum of two simple constant amplitude vectors (phasors).

In a typical wireless transmitter that uses I-Q modulation, an input data comprises an in-phase component and a quadrature component. The I-Q transmitter comprises a DAC, for example an RFDAC that convert the in-phase and the quadrature components to a pair of I and Q output signals. RFDACs directly convert a digital baseband signal into an RF output signal, by using a building block which combines digital-to-analog conversion and up conversion mixing. High-performance digital-to-analog converters with high resolution can provide the flexibility needed to support multiple frequency bands and multiple standards in modern wireless communication transmitters. For cellular applications such as WCDMA or LTE, the required resolution of DACs is typically in the range of 15 bits. However, the high resolution DACs lead to higher power dissipation and implementation area.

BRIEF DESCRIPTION OF THE DRAWINGS

Some examples of circuits, apparatuses and/or methods will be described in the following by way of example only. In this context, reference will be made to the accompanying Figures.

FIG. 5 depicts an example implementation of a tri-level DTC in a TOCAP transmitter, according to one embodiment of the disclosure.

FIG. 6a depicts an example implementation of a tri-level DTC in a TOCAP transmitter, according to another embodiment of the disclosure.

FIG. 6b depicts the three-level modulated square waveform generated by the tri-level DTC of FIG. 6a, according to one embodiment of the disclosure.

DETAILED DESCRIPTION

Figure 1:
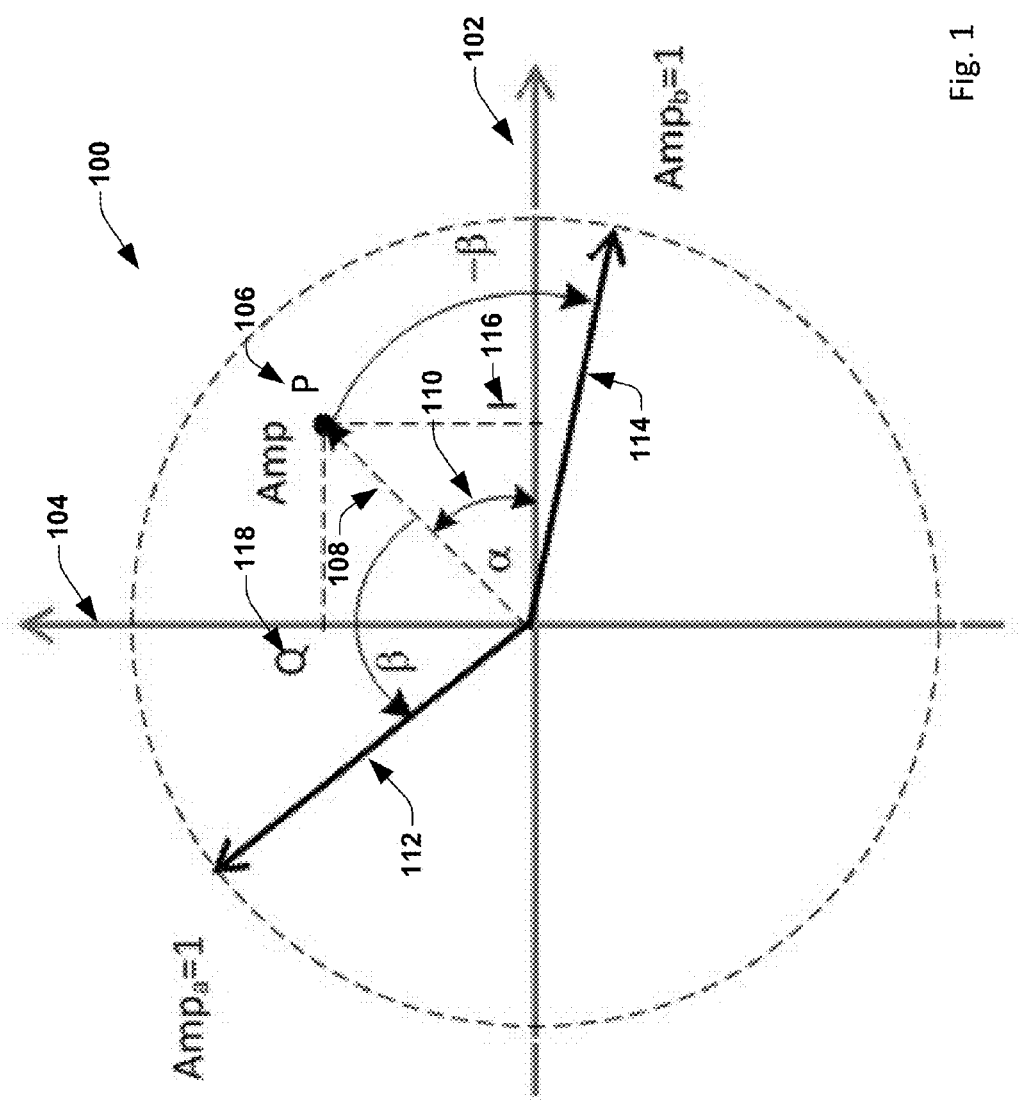
FIG. 1 depicts a mapping procedure that expresses a point co-ordinate in a two-dimensional plane as a sum of two constant amplitude phase modulated phasors (TOCAP), according to one embodiment of the disclosure.

In one embodiment of the disclosure, a transmitter comprising a phase computation circuit and a modulation circuit is disclosed. The phase computation circuit is configured to receive a complex baseband signal comprising an in-phase signal and a quadrature signal forming an I-Q data pair, and determine a first rotation angle and a second rotation angle based on the I-Q data pair. The modulation circuit is coupled to the phase computation circuit and is configured to determine a three-level modulated waveform having a lower negative level, a zero level and a higher positive level, based on the first rotation angle and the second rotation angle; and generate the three-level modulated waveform based on the determination.

In one embodiment of the disclosure, a modulation method is disclosed. The modulation method comprises receiving a complex baseband signal comprising an in-phase signal and a quadrature signal forming an I-Q data pair, and determining a first rotation angle and a second rotation angle based on the I-Q data pair, using a phase computation circuit. The modulation method further comprises determining a three-level modulated waveform having a lower negative level, a zero level and a higher positive level, based on the first rotation angle and the second rotation angle, and generating the determined three-level modulated waveform, using a modulation circuit.

In one embodiment of the disclosure, a transmitter comprising a phase computation circuit and a digital-to-time converter (DTC) circuit is disclosed. The phase computation circuit is configured to receive a complex baseband signal comprising an in-phase signal and a quadrature signal forming an I-Q data pair, and determine a first rotation angle and a second rotation angle based on the I-Q data pair. The digital-to-time converter (DTC) circuit comprises a single tri-level DTC coupled to the phase computation circuit and is configured to generate a three-level modulated waveform having a lower negative level, a zero level and a higher positive level, based on the first rotation angle and the second rotation angle.

In one embodiment of the disclosure, a modulation method is disclosed. The modulation method comprises receiving a complex baseband signal comprising an in-phase signal and a quadrature signal forming an I-Q data pair, and determining a first rotation angle and a second rotation angle based on the I-Q data pair, using a phase computation circuit. The modulation method further comprises generating a three-level modulated waveform having a lower negative level, a zero level and a higher positive level, based on the first rotation angle and the second rotation angle, using a single tri-level digital-to-time converter (DTC).

The present disclosure will now be described with reference to the attached drawing figures, wherein like reference numerals are used to refer to like elements throughout, and wherein the illustrated structures and devices are not necessarily drawn to scale. As utilized herein, terms "module", "component," "system," "circuit," "element," "slice," and the like are intended to refer to a computer-related entity, hardware, software (e.g., in execution), and/or firmware. For example, a circuit or similar term can be a processor, a process running on a processor, a controller, an object, an executable program, a storage device, and/or a computer with a processing device. By way of illustration, an application running on a server and the server can also be a circuit. One or more circuits can reside within a process, and a circuit can be localized on one computer and/or distributed between two or more computers. A set of elements or a set of other circuits can be described herein, in which the term "set" can be interpreted as "one or more."

As another example, a circuit or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a circuit can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

As indicated above, in modern wireless digital communication standards, each sample of the baseband signal to be transmitted is equivalent to the coordinates of a point in a two dimensional plane and consequently, the alternative transmitter architectures used in practice correspond to alternative ways of expressing the point coordinates. For example, in polar modulation scheme, where the co-ordinates of the point in the two dimensional plane is expressed as polar co-ordinates having an amplitude and a phase variable, existing implementations of polar modulators based on digital-to-time converters (DTC for phase modulation) and digital-to-analog converters (DAC for amplitude modulation) are utilized to generate a desired radio frequency (RF) waveform.

In this disclosure, a modulation scheme for an alternate mapping procedure of the point co-ordinates in the two-dimensional plane, wherein the point co-ordinates are expressed as a sum of two constant amplitude phase modulated phasors (TOCAP) is proposed. Further, a transmitter architecture that implements the proposed modulation scheme is also proposed. In particular, a transmitter architecture that utilizes a single DTC (e.g., a single tri-level DTC) to implement the TOCAP modulation scheme is disclosed. In some embodiments, the proposed transmitter architecture enables to eliminate the DACs used in conventional polar modulators, thereby greatly reducing the power consumption and the implementation area.

FIG. 1 depicts a mapping procedure 100 that express a point co-ordinate in a two-dimensional plane as a sum of two constant amplitude phase modulated phasors (TOCAP), according to one embodiment of the disclosure. The two dimensional plane comprises an I-axis 102 and a Q-axis 104 that are orthogonal to one another. Let P 106 be a point in the two dimensional plane. When expressed in polar co-ordinate form, the point P 106 has an amplitude 108 and a phase angle α 110 associated with it. In the mapping procedure 100, the point P 106 is expressed as a sum of a first constant amplitude phasor 112 and a second constant amplitude phasor 114 that are phase shifted from one another. For example, the first constant amplitude phasor 112 has a phase angle β with respect to the point P 106 and the second constant amplitude phasor 114 has a phase angle −β with respect to the point P 106. Further, the amplitudes of the first constant amplitude phasor 112 and the second constant amplitude phasor 114 are the same.

In some embodiments, the co-ordinates of the first constant amplitude phasor 112 and the second constant amplitude phasor 114 are expressed in terms of an amplitude and a phase angle with respect to the I-axis 102. For example, the first constant amplitude phasor 112 has an amplitude $Amp_a$ and a phase α+β, and the second constant amplitude phasor 114 has an amplitude $Amp_b$ and a phase α−β. In some embodiments, the point P 106 is expressed in terms of I-Q co-ordinates I 116 and Q 118. In some embodiments, the co-ordinates of the first constant amplitude phasor 112 and the second constant amplitude phasor 114 can be derived in terms of the I-Q co-ordinates I 116 and Q 118 as given below:

$$\alpha = \arctan\left(\frac{Q}{I}\right) \quad (1)$$

In some embodiments, in order to derive the phase angle β, for simplicity, the first constant amplitude phasor 112 and the second constant amplitude phasor 114 are considered to be of unity amplitude. That is, $Amp_a=1$ and $Amp_b=1$. From FIG. 1, in order to express the phase angle β in terms of the I-Q co-ordinates I 116 and Q 118, we can write, $$\cos(\alpha+\beta)+\cos(\alpha-\beta)=I \quad (2)$$

Where $\cos(\alpha+\beta)$ corresponds to the real part of the first constant amplitude phasor 112 and $\cos(+-\beta)$ corresponds to the real part of the second constant amplitude phasor 114. Similarly, $$\sin(\alpha+\beta)+\sin(\alpha-\beta)=Q \quad (3)$$

Where $\sin(\alpha+\beta)$ corresponds to the imaginary part of the first constant amplitude phasor 112 and $\sin(\alpha-\beta)$ corresponds to the imaginary part of the second constant amplitude phasor 114.

On solving equations (2) and (3), we get, $$\cos(\beta) = \frac{I}{2\cos(\alpha)} \quad (4)$$

$$\sin(\beta) = \frac{Q}{2\sin(\alpha)} \quad (5)$$

Figure 2:
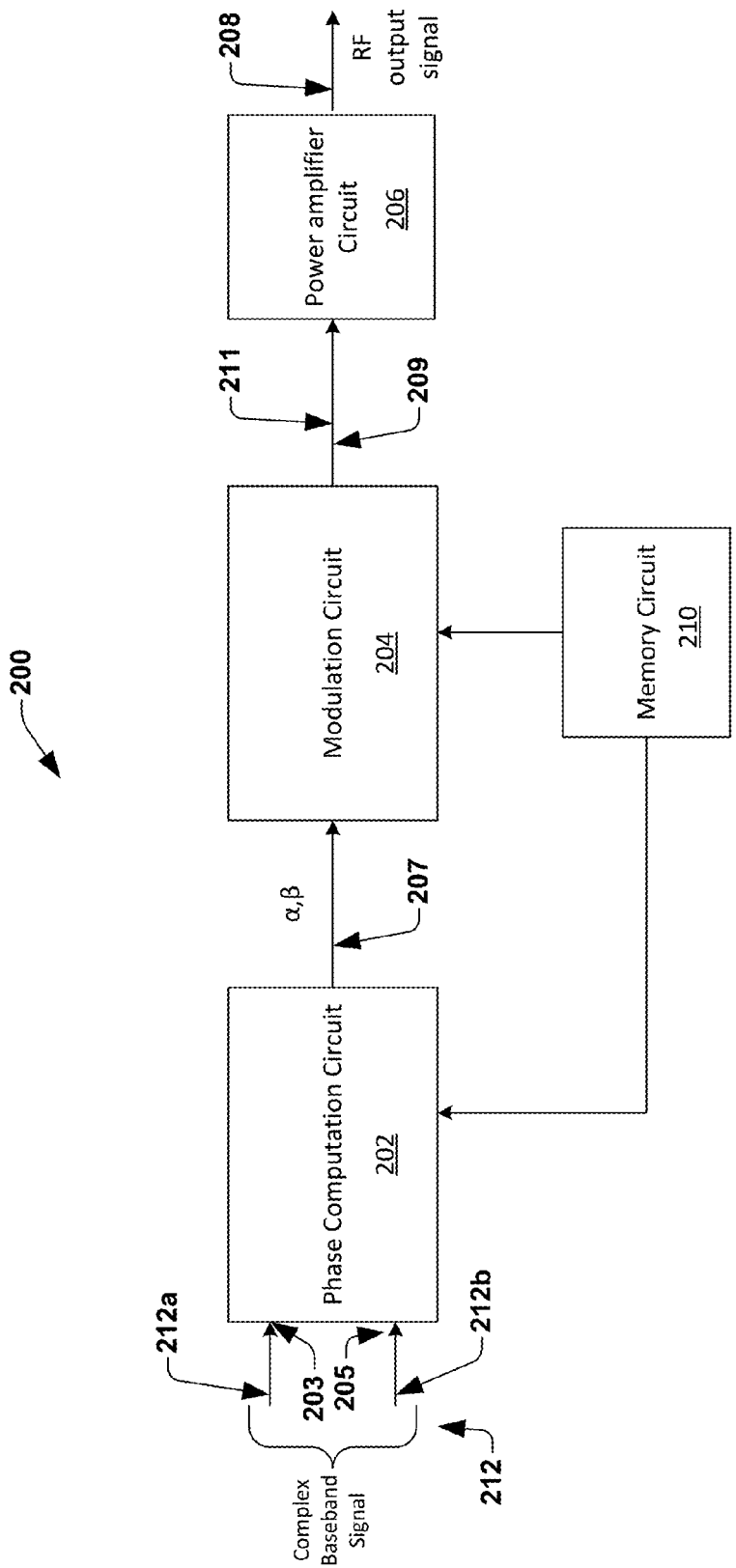
FIG. 2 depicts a simplified block diagram of a two constant amplitude phase modulated phasors (TOCAP) transmitter, according to one embodiment of the disclosure.

FIG. 2 depicts a simplified block diagram of a two constant amplitude phase modulated phasors (TOCAP) transmitter 200, according to one embodiment of the disclosure. In some embodiments, the TOCAP transmitter 200 comprises an apparatus to implement a modulation scheme in wireless communication devices/systems. In some embodiments, the TOCAP transmitter 200 is included in the transmit path of a transceiver in wireless communication systems. In some embodiments, the TOCAP transmitter 200 is configured to implement the TOCAP mapping procedure 100 explained in FIG. 1. The TOCAP transmitter 200 comprises a phase computation circuit 202, a modulation circuit 204 and a power amplifier circuit 206. In some embodiments, the modulation circuit 204 can be a part of a radio frequency (RF) front end of the TOCAP transmitter 200. The phase computation circuit 202 is configured to receive a complex baseband signal 212 comprising an in-phase signal 212a and a quadrature signal 212b and generate a first rotation angle $\alpha$ and a second rotation angle $\beta$ based on the in-phase signal 212a and the quadrature signal 212b.

In some embodiments, the phase computation circuit 202 is configured to receive the in-phase signal 212a at a first input 203 and the quadrature signal 212b at a second input 205. In some embodiments, the first rotation angle $\alpha$ and the second rotation angle $\beta$ are determined in the phase computation circuit 202 in accordance with the equations (1), (4) and (5) as indicated above. In some embodiments, the TOCAP transmitter 200 further comprises a memory circuit 210 coupled to the phase computation circuit 202 configured to store the instructions to implement the equations (1), (4) and (5). The modulation circuit 204 is located downstream of the phase computation circuit 202 and is configured to receive the first rotation angle $\alpha$ and the second rotation angle $\beta$ from the phase computation circuit 202 over the signal path 207.

The modulation circuit 204 is further configured to generate a three-level modulated waveform 211 over the signal path 209. In some embodiments, the three-level waveform 211 comprises a lower negative level, a zero level and an upper positive level (not shown). In some embodiments, the modulation circuit 204 is further configured to determine a position of a transition between the lower negative level and the zero level, and a position of a transition between the zero level and the upper positive level, prior to generating the three-level modulated waveform 211. In some embodiments, the first rotation angle $\alpha$ provides information on the center point of the zero level and the second rotation angle $\beta$ provides information on the width of the zero level.

In some embodiments, the modulation circuit 204 comprises a single tri-level DTC configured to generate the three-level modulated waveform 211. In some embodiments, the modulation circuit 204 further comprises a local oscillator circuit configured to generate an unmodulated square waveform. In some embodiments, the three-level modulated waveform 211 is generated by modulating the unmodulated square waveform within the modulation circuit, based on the information of the first rotation angle $\alpha$ and the second rotation angle 3. In some embodiments, the three-level modulated waveform 211 can comprise all the information required to be transmitted by a digital wireless communication standard. For example, in some embodiments, the co-ordinates of the complex baseband signal 212 (e.g., the co-ordinate point P 106 in FIG. 1 above) to be transmitted is modulated into two parameters of the three-level modulated waveform 211, that is, the time width of the zero level of the three-level modulated waveform 211 and the location in time of the center of the zero level with respect to the unmodulated square waveform. In some embodiments, the memory circuit 210 is further coupled to the modulation circuit 204 and configured to store the instructions for generating the three-level modulated waveform 211.

Figure 3:
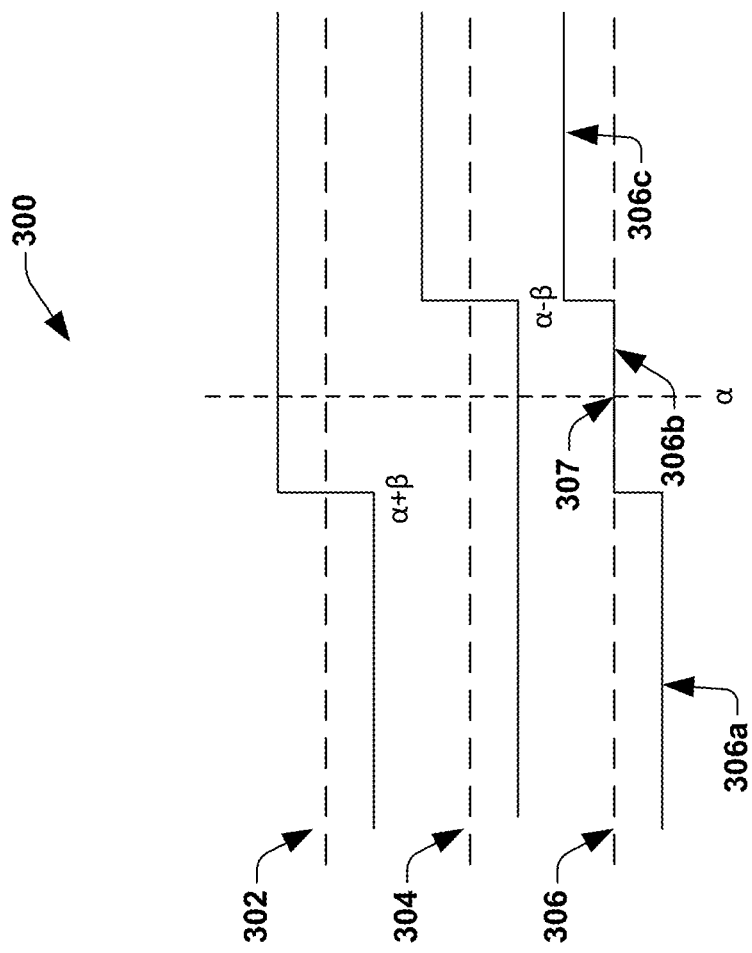
FIG. 3 depicts a three-level modulated waveform that is amplitude and phase modulated, according to one embodiment of the disclosure.

The power amplifier circuit 206 is located downstream of the modulation circuit 204 and is configured to amplify the three-level modulated waveform 211 to generate a radio frequency (RF) output signal 208. In some embodiments, a characterization of the complex baseband signal 212 (e.g., the co-ordinate point P 106 in FIG. 1 above) as the three-level modulated waveform 211 can be explained as given in FIG. 3. For example, the three-level modulated waveform 306 in FIG. 3 (e.g., the co-ordinate point P 106 in FIG. 1 above) corresponds to a sum of a first square waveform 302 with a phase shift of $\alpha+\beta$ (corresponding to the first constant amplitude phasor 112 in FIG. 1) and a second square waveform 304 with a phase shift of $\alpha-\beta$ (corresponding to the second constant amplitude phasor 114 in FIG. 1).

In some embodiments, the first square waveform 302 includes phase modulation in order to carry all the information of the first constant amplitude phasor 112 in FIG. 1. Similarly, in some embodiments, the second square waveform 304 includes phase modulation in order to carry all the information of the second constant amplitude phasor 114 in FIG. 1. Therefore, in such embodiments, a combination or a sum of the first square waveform 302 and the second square waveform 304 corresponds to the three-level modulated square waveform 306 that is amplitude modulated and phase modulated to carry all the information of the co-ordinate point P 106 in FIG. 1 (corresponding to the complex baseband signal 212 in FIG. 2). In some embodiments, the three-level modulated square waveform 306 comprises a lower negative level 306a, a zero level 306b (i.e., a deadtime) and an upper positive level 306c. In some embodiments, the width of the zero level corresponds to $2\beta$ and a center point 307 of the zero level 306b is defined by a. In some embodiments, the information contained in the complex baseband signal, for example, the complex baseband signal 212 in FIG. 2, is modulated on to the time-width of the zero level 306b (i.e., the dead time) and the center position of the zero level 306b of the three-level modulated square waveform 306.

Figure 4:
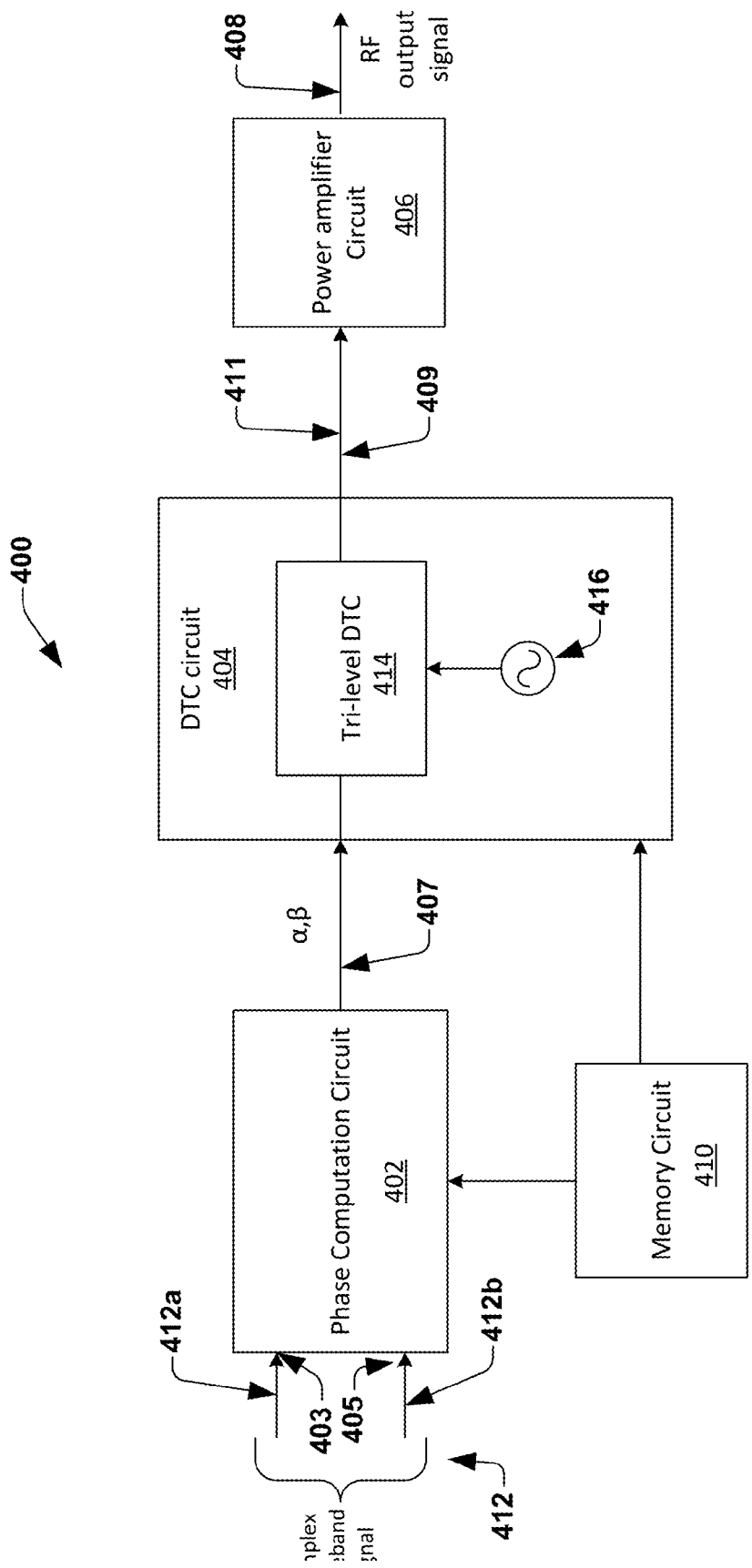
FIG. 4 depicts an example implementation of a two constant amplitude phase modulated phasors (TOCAP) transmitter, according to one embodiment of the disclosure.

FIG. 4 depicts an example implementation of a two constant amplitude phase modulated phasors (TOCAP) transmitter 400, according to one embodiment of the disclosure. In some embodiments, the TOCAP transmitter 400 is included in the transmit path of a transceiver in wireless communication systems. In some embodiments, the TOCAP transmitter 400 is configured to implement the TOCAP mapping procedure 100 explained in FIG. 1. The TOCAP transmitter 400 is similar to the TOCAP transmitter 200 in FIG. 2, with a tri-level DTC 414 in place of the modulation circuit 204 in FIG. 2. The TOCAP transmitter 400 comprises a phase computation circuit 402, a digital-to-time converter (DTC) circuit 404 and a power amplifier circuit 406. In some embodiments, the DTC circuit 404 can be a part of a radio frequency (RF) front end of the TOCAP transmitter 400. The phase computation circuit 402 is configured to receive a complex baseband signal 412 comprising an in-phase signal 412a and a quadrature signal 412b and generate a first rotation angle $\alpha$ and a second rotation angle $\beta$ based on the in-phase signal 412a and the quadrature signal 412b.

In some embodiments, the phase computation circuit 402 is configured to receive the in-phase signal 412a at a first input 403 and the quadrature signal 412b at a second input 405. In some embodiments, the first rotation angle $\alpha$ and the second rotation angle $\beta$ are determined in the phase computation circuit 402 in accordance with the equations (1), (4) and (5) as indicated above. In some embodiments, the TOCAP transmitter 400 further comprises a memory circuit 410 coupled to the phase computation circuit 402 configured to store the instructions to implement the equations (1), (4) and (5). The DTC circuit 404 is located downstream of the phase computation circuit 402 and is configured to receive the first rotation angle $\alpha$ and the second rotation angle $\beta$ from the phase computation circuit 402 over the signal path 407.

In some embodiments, the DTC circuit 404 comprises a single tri-level DTC 414 configured to generate a three-level modulated waveform 411 (not shown) over the signal path 409. In some embodiments, the three-level waveform 411 comprises a lower negative level, a zero level and an upper positive level. In some embodiments, the tri-level DTC 414 is further configured to determine a position of a transition between the lower negative level and the zero level, and a position of a transition between the zero level and the upper positive level based on the first rotation angle $\alpha$ and the second rotation angle $\beta$, prior to generating the three-level modulated waveform 411. In some embodiments, the first rotation angle $\alpha$ provides information on the center point of the zero level and the second rotation angle $\beta$ provides information on the width of the zero level.

In some embodiments, the DTC circuit 404 further comprises a local oscillator circuit 416 coupled to the tri-level DTC 414 and configured to generate an unmodulated square waveform (not shown). In some embodiments, the three-level modulated waveform 411 is generated by modulating the unmodulated square waveform within the single tri-level DTC 414, based on the information of the first rotation angle $\alpha$ and the second rotation angle $\beta$. In some embodiments, the three-level modulated waveform 411 can comprise all the information required to be transmitted by a digital wireless communication standard. For example, in some embodiments, the co-ordinates of the complex baseband signal 412 (e.g., the co-ordinate point P 106 in FIG. 1 above) to be transmitted is modulated into two parameters of the three-level modulated waveform 411, that is, the time width of the zero level of the three-level modulated waveform 411 (i.e., the dead-time) and the location in time of the center of the zero level with respect to the unmodulated square waveform. In some embodiments, the memory circuit 410 is further coupled to the DTC circuit 404 and configured to store the instructions for generating the three-level modulated waveform 411. The power amplifier circuit 406 is located downstream of the DTC circuit 404 and is configured to amplify the three-level modulated waveform 411 to generate a radio frequency (RF) output signal 408.

FIG. 5 depicts an example implementation of a tri-level DTC 500 in a TOCAP transmitter, according to one embodiment of the disclosure. In some embodiments, the tri-level DTC 500 in FIG. 5 is similar to the single tri-level DTC 414 in FIG. 4. The implementation explained herein is one of the possible implementations of the single tri-level DTC 414, however, other implementations of the single tri-level DTC 414 that generates a three-level modulated waveform is contemplated and is within the scope of this disclosure. The tri-level DTC 500 comprises a tri-level phase modulator circuit 502, a mixer circuit 504, a mirror circuit 508 and a constant current source 506. The tri-level phase modulator circuit 502 is configured to receive an unmodulated square waveform, and information on a first rotation angle $\alpha$ and a second rotation angle $\beta$ (e.g., $\alpha$ and $\beta$ in FIG. 4) and generate a three-level phase modulated waveform 503 at an output of the tri-level phase modulator circuit 502. In some embodiments, the three-level phase modulated waveform 503 comprises a lower negative level, a zero level and an upper positive level. In some embodiments, the tri-level phase modulator circuit 502 can comprise a plurality of inverters in series (e.g., a cascade of inverters), each of which introduces a delay to the unmodulated square waveform. In some embodiments, the unmodulated square waveform is provided to the cascade of inverters and a delay corresponding to $\alpha$ and $\beta$ are generated based on taking the output from one or more inverters of the cascade of inverters that provide a delay corresponding to $\alpha$ and $\beta$. In some embodiments, the tri-level phase modulator circuit 502 comprises a DTC.

Further, in some embodiments, the third level (e.g., the zero level or the dead-time) can be generated by introducing an inverter circuit having three switches. For example, to obtain a positive level, a first switch connected to VDD is turned on and to get a negative level, a second switch connected to ground is turned on. Similarly, in order to get an intermediate level (e.g., the zero level or the dead-time) a third switch connected to VDD/2 is turned on. In some embodiments, the control signals that controls the first switch, the second switch and the third switch are generated based on tapping the outputs of one or more inverters of the cascade of inverters based on $\alpha$ and $\beta$. In some embodiments, the co-ordinates of a signal to be transmitted (e.g., the complex baseband signal 412 in FIG. 4) is modulated into two parameters of the three-level phase modulated waveform 503, that is, the time width of the zero level (i.e., the dead-time) of the three-level phase modulated waveform 503 and the location in time of the center of the zero level with respect to the unmodulated square waveform.

The mixer circuit 504 is coupled to the tri-level phase modulator circuit 502 and is configured to provide a multiplication of the three-level phase modulated waveform 503 and a constant current signal 507 from the constant current source 506. In some embodiments, the multiplication of the three-level phase modulated waveform 503 and a constant current signal 507 at the mixer circuit 504 enables to convert the three-level phase modulated waveform 503 from digital domain to analog domain to generate a radio frequency (RF) output signal 510 for transmission. The mixer circuit 504 further comprises at least a first switch 504a and a second switch 504*b* which are controlled by the three-level phase modulated waveform 503 that enables the multiplication of the three-phase modulated waveform 503 and the constant current signal 507. For example, during the lower negative level of the three-level phase modulated waveform 503 the first switch 504*a* is turned on, during the upper positive level of the three-level phase modulated waveform 503 the second switch 504*b* is turned on and during the zero level of the waveform the switches 504*a* and 504*b* are turned off and an eventual dumping path for the current is turned on. The mirror circuit 508 is coupled to the mixer circuit 504 and comprises a plurality of inductors to generate the net effect of the multiplication of the three-level phase modulated waveform 503 and a constant current signal 507 together with the mixer circuit 504.

In some embodiments, the mixer circuit 504 and the constant current source 506 can be replaced by a 2-bit digital to analog converter (DAC) with 2 current sources (not shown). In such embodiments, for example, during the lower negative level of the three-level phase modulated waveform 503, a bit 00 is provided to the DAC that indicates the DAC not to provide any current at its output. Similarly, during the zero level of the three-level phase modulated waveform 503, a bit 01 is provided to the DAC that indicates the DAC to provide current from one of the current sources at its output. Further, during the upper positive level of the three-level phase modulated waveform 503, a bit 11 is provided to the DAC that indicates the DAC to provide current from both the current sources at its output. In some embodiments, the bits 00, 01 and 11 are provided to the DAC from the tri-level phase modulator 502 based on $\alpha$ and $\beta$.

FIG. 6*a* depicts an example implementation of a tri-level DTC 600 in a TOCAP transmitter, according to one embodiment of the disclosure. In some embodiments, the tri-level DTC 600 in FIG. 6*a* is explained herein with reference to the single tri-level DTC 414 in FIG. 4. The tri-level DTC 600 comprises a processing circuit 602 configured to generate a first square waveform 604 and a second square waveform 606 which are phase shifted from one another. In some embodiments, the first square wave 604 corresponds to the square waveform 652 in FIG. 6*b* with a phase shift of $\alpha+\beta$ and the second square waveform 606 corresponds to the square waveform 654 in FIG. 6*b* with a phase shift of $\alpha-\beta$. However, in other embodiments, the phase shift associated with the first square waveform 604 and the second square waveform 606 can be different. In some embodiments, the processing circuit 602 is configured to receive phase signals having information on a, 13 (e.g., $\alpha$, $\beta$ over the signal path 407 in FIG. 4) and an unmodulated square waveform and generate the first square waveform 604 and the second square waveform 606 by modulating the unmodulated square waveform based on $\alpha$ and $\beta$.

In some embodiments, the processing circuit 602 comprises a cascade of inverters and the first square waveform 604 and the second square waveform 606 are generated by taking outputs from a first position and a second position along the cascade as explained above with respect to FIG. 5. For example, in some embodiments, the first square waveform 604 is generated by taking output from an inverter in the cascade of inverters that give a delay of $\alpha+\beta$ and the second square waveform 606 is generated by taking output from an inverter in the cascade of inverters that give a delay of $\alpha-\beta$. The tri-level DTC 600 further comprises an inductor circuit comprising a pair of coupled inductors 608 and 610 configured to receive the first square waveform 604 and the second square waveform 606 and generate a three-level modulated waveform 656 at an output 612. In some embodiments, the three-level modulated waveform 656 is same as the three-level modulated waveform 411 in FIG. 4 and is both amplitude and phase modulated to comprise all the information of the complex baseband signal 412 in FIG. 4. In some embodiments, the phase shift associated with the first square waveform 604 and the second square waveform 606 are chosen in such a way to generate the three-level modulated waveform 656 having a dead-time of 2β and a center point of the dead-time defined by a. In some embodiments, the processing circuit 602 comprises a single digital-to-time converter (DTC).

Figure 7:
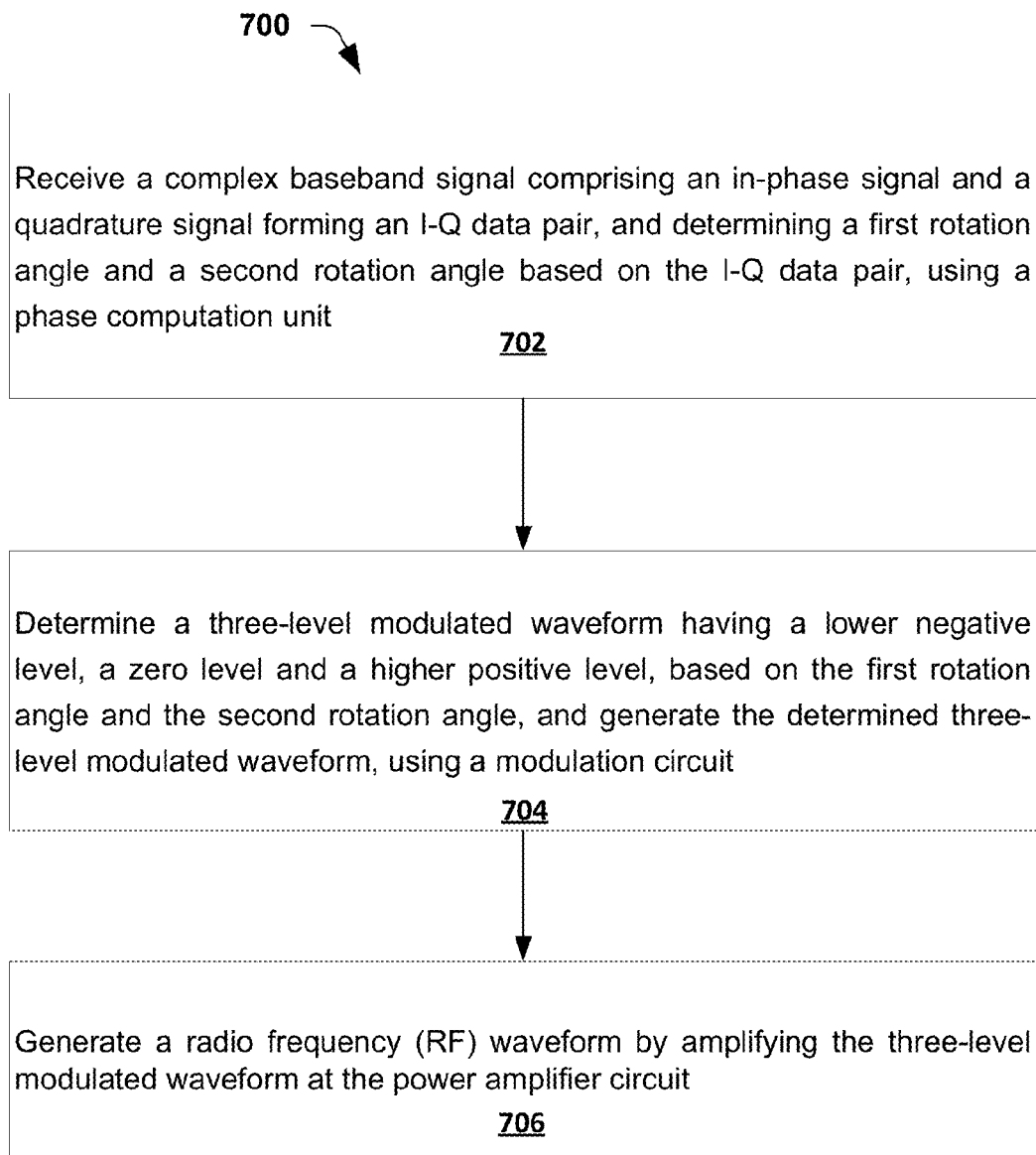
FIG. 7 shows a flowchart of a modulation method that generates a three-level modulated waveform, according to one embodiment of the disclosure.

FIG. 7 shows a flowchart of a modulation method 700 that generates a three-level modulated waveform, according to one embodiment of the disclosure. The method 700 is described herein with respect to the TOCAP transmitter 200 in FIG. 2. At 702, a complex baseband signal 212 comprising an in-phase signal 212*a* and a quadrature signal 212*b* forming an I-Q data pair is received at the phase computation circuit 202, and a first rotation angle $\alpha$ and a second rotation angle $\beta$ are determined based thereon. In some embodiments, the first rotation angle $\alpha$ and the second rotation angle $\beta$ are determined based on equation (1), (4) and (5) above. At 704, a three-level modulated waveform 211 having a lower negative level, a zero level and a higher positive level is determined and generated at the modulation circuit 204, based on the first rotation angle $\alpha$ and the second rotation angle 3. In some embodiments, determining the three-level modulated waveform 211 comprises determining a position of a center point of the zero level and determining a width of the zero level based on the first rotation angle $\alpha$ and the second rotation angle 3. At 706, a radio frequency (RF) waveform 208 is generated by amplifying the three-level modulated waveform 211 at the power amplifier circuit 206.

Figure 8:
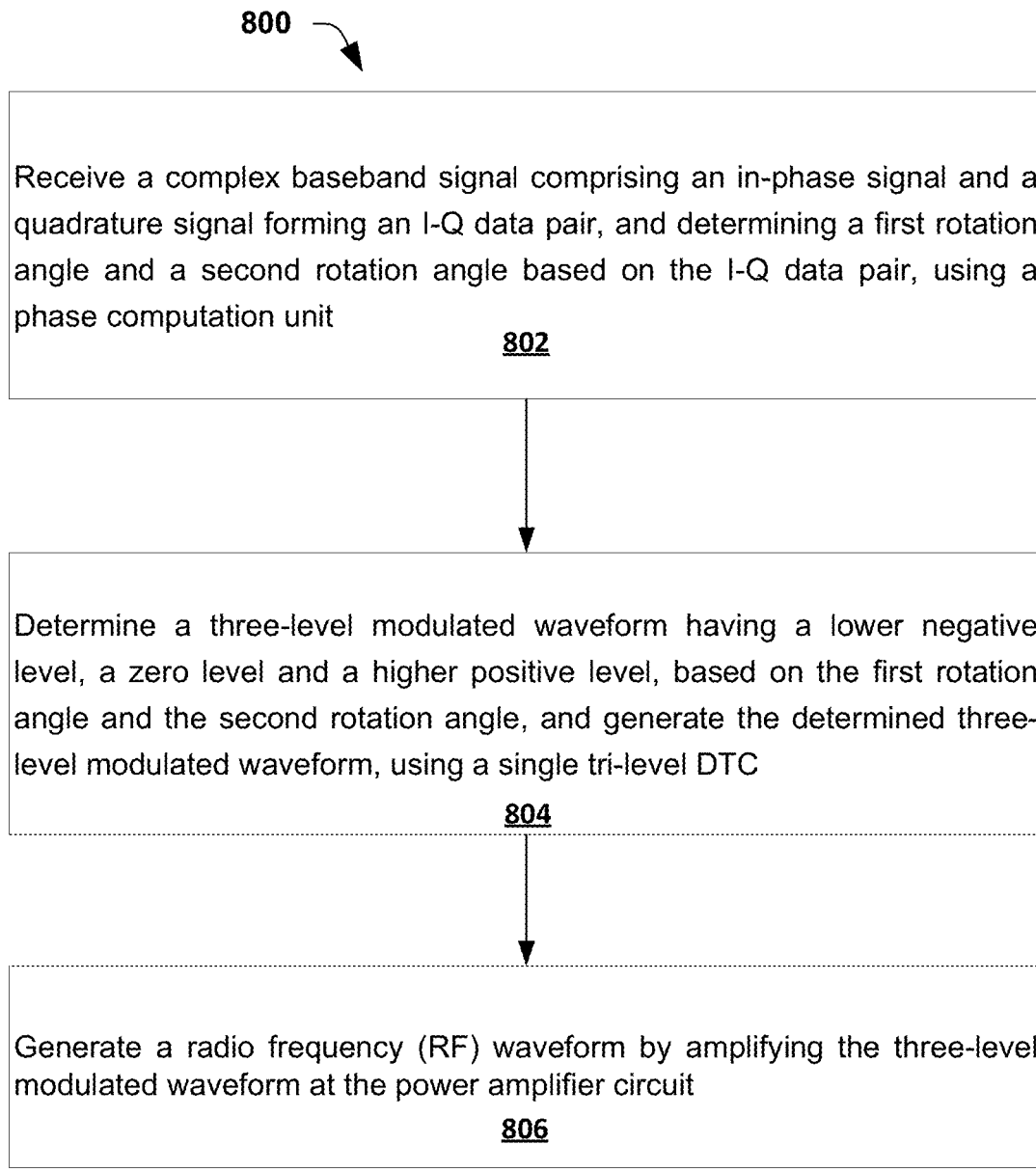
FIG. 8 shows a flowchart of a modulation method that generates a three-level modulated waveform utilizing a single tri-level DTC, according to one embodiment of the disclosure.

FIG. 8 shows a flowchart of a modulation method 800 that generates a three-level modulated waveform utilizing a single tri-level DTC, according to one embodiment of the disclosure. The method 800 is described herein with respect to the TOCAP transmitter 400 in FIG. 4. At 802, a complex baseband signal 412 comprising an in-phase signal 412*a* and a quadrature signal 412*b* forming an I-Q data pair is received at the phase computation circuit 402, and a first rotation angle $\alpha$ and a second rotation angle $\beta$ are determined based thereon. In some embodiments, the first rotation angle $\alpha$ and the second rotation angle $\beta$ are determined based on equation (1), (4) and (5) above. At 804, a three-level modulated waveform 411 having a lower negative level, a zero level and a higher positive level is determined and generated at the single tri-level DTC 204, based on the first rotation angle $\alpha$ and the second rotation angle $\beta$. In some embodiments, determining the three-level modulated waveform 411 comprises determining a position of a center point of the zero level and determining a width of the zero level based on the first rotation angle $\alpha$ and the second rotation angle $\beta$. At 806, a radio frequency (RF) waveform 408 is generated by amplifying the three-level modulated waveform 411 at the power amplifier circuit 406.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a transmitter or an apparatus adapted for a modulation scheme in a wireless communication device comprising a phase computation circuit configured to receive a complex baseband signal comprising an in-phase signal and a quadrature signal forming an I-Q data pair, and determine a first rotation angle and a second rotation angle based on the I-Q data pair; and a modulation circuit coupled to the phase computation circuit, and configured to determine a three-level modulated waveform having a lower negative level, a zero level and a higher positive level, based on the first rotation angle and the second rotation angle; and generate the three-level modulated waveform based on the determination.

Example 2 is a transmitter including the subject matter of example 1, wherein the modulation circuit comprises a single tri-level digital-to-time converter (DTC) configured to generate the three-level modulated waveform.

Example 3 is a transmitter including the subject matter of examples 1-2, including or omitting elements, wherein the modulation circuit further comprises a local oscillator coupled to the single tri-level DTC and configured to generate an unmodulated square waveform.

Example 4 is a transmitter including the subject matter of examples 1-3, including or omitting elements, wherein the single tri-level DTC is configured to generate the three-level modulated waveform by modulating the unmodulated square waveform provided by the local oscillator.

Example 5 is a transmitter including the subject matter of examples 1-4, including or omitting elements, wherein the three-level modulated waveform comprises a radio frequency signal.

Example 6 is a transmitter including the subject matter of examples 1-5, including or omitting elements, wherein the modulation circuit is configured to determine the three-level modulated waveform by determining a position of a center point of the zero level and determining a width of the zero level, based on the first rotation angle and the second rotation angle.

Example 7 is a transmitter including the subject matter of examples 1-6, including or omitting elements, wherein the modulation circuit is configured to determine the position of the center point of the zero level based on the first rotation angle, and determine the width of the zero level based on the second rotation angle.

Example 8 is a modulation method comprising receiving a complex baseband signal comprising an in-phase signal and a quadrature signal forming an I-Q data pair at a phase computation circuit, determining a first rotation angle and a second rotation angle based on the I-Q data pair, using the phase computation circuit; determining a three-level modulated waveform having a lower negative level, a zero level and a higher positive level, based on the first rotation angle and the second rotation angle using a modulation circuit, and generating the determined three-level modulated waveform, using the modulation circuit.

Example 9 is a modulation method including the subject matter of example 8, wherein determining the three-level modulated waveform comprises determining a position of a center point of the zero level and determining a width of the zero level.

Example 10 is a modulation method including the subject matter of examples 8-9, including or omitting elements, wherein generating the determined three-level modulated waveform comprises modulating an unmodulated square waveform from a local oscillator within the modulation circuit.

Example 11 is a transmitter adapted for a modulation scheme used in a wireless communication device, the transmitter comprising a phase computation circuit configured to receive a complex baseband signal comprising an in-phase signal and a quadrature signal forming an I-Q data pair, and determine a first rotation angle and a second rotation angle based on the I-Q data pair; and a digital-to-time converter (DTC) circuit comprising a single tri-level DTC coupled to the phase computation circuit and configured to generate a three-level modulated waveform having a lower negative level, a zero level and a higher positive level, based on the first rotation angle and the second rotation angle.

Example 12 is a transmitter including the subject matter of example 11, wherein the DTC circuit further comprises a local oscillator coupled to the single tri-level DTC and configured to generate an unmodulated square waveform.

Example 13 is a transmitter including the subject matter of examples 11-12, including or omitting elements, wherein the single tri-level DTC is configured to generate the three-level modulated square waveform by modulating the unmodulated square waveform, wherein a position of a transition between the lower negative level and the zero level, and a position of a transition between the zero level and the higher positive level are defined by the first rotation angle and the second rotation angle.

Example 14 is a transmitter including the subject matter of examples 11-13, including or omitting elements, wherein the single tri-level DTC comprises a tri-level phase modulator circuit comprising a cascade of inverters configured to receive the unmodulated square waveform from the local oscillator, and the first rotation angle and the second rotation angle from the phase computation circuit, and generate the three-level modulated waveform by taking output from one or more inverters of the cascade of inverters that gives a predetermined delay based on the first rotation angle and the second rotation angle.

Example 15 is a transmitter including the subject matter of examples 11-14, including or omitting elements, wherein the single tri-level DTC further comprises a mixer circuit coupled to the tri-level phase modulator circuit configured to generate a multiplication of the three-level modulated waveform with a constant current signal to generate a radio frequency (RF) signal for transmission.

Example 16 is a transmitter including the subject matter of examples 11-15, including or omitting elements, wherein the single tri-level DTC comprises a two-bit digital-to-analog converter (DAC) with two current sources configured to generate three different current levels at delayed time intervals from one another, in accordance with an input signal based on the first rotation angle and the second rotation angle.

Example 17 is a transmitter including the subject matter of examples 11-16, including or omitting elements, wherein the single tri-level DTC further comprises a tri-level phase modulator circuit coupled to the DAC, and configured to receive the first rotation angle and the second rotation angle from the phase computation circuit and generate the input signal to be provided to the DAC.

Example 18 is a transmitter including the subject matter of examples 11-17, including or omitting elements, wherein the single tri-level DTC comprises a processing circuit comprising a cascade of inverters configured to generate a first square waveform having a first phase shift and a second square waveform having a second, different phase shift based on the first rotation angle and the second rotation angle, wherein the first square waveform and the second square waveform are generated by taking outputs from a first position and a second, different position of the cascade of inverters that gives the first phase shift and the second phase shift, respectively; and an inductor circuit comprising a pair of coupled inductors configured to receive the first square waveform and the second square waveform, and generate the three-level modulated waveform based thereon.

Example 19 is a transmitter including the subject matter of examples 11-18, including or omitting elements, wherein the first rotation angle and the second rotation angle are determined based on a first predetermined relation and a second predetermined relation, respectively, of the I-Q data pair.

Example 20 is a transmitter including the subject matter of examples 11-19, including or omitting elements, wherein the I-Q data pair defines an I-Q phasor in an I-Q constellation diagram having an I-Q phase angle associated therewith and the first rotation angle corresponds to the I-Q phase angle.

Example 21 is a transmitter including the subject matter of examples 11-20, including or omitting elements, wherein the complex baseband signal is further defined by a first constant amplitude phase modulated phasor and a second constant amplitude phase modulated phasor, and wherein the second rotation angle corresponds to an angle between the I-Q phasor and the first constant amplitude phase modulated phasor or the second constant amplitude phase modulated phasor.

Example 22 is a transmitter including the subject matter of examples 11-21, including or omitting elements, wherein a center point of the zero level of the three-level modulated waveform is defined by the first rotation angle and a width of the zero level is defined by the second rotation angle.

Example 23 is a modulation method comprising receiving a complex baseband signal comprising an in-phase signal and a quadrature signal forming an I-Q data pair, and determining a first rotation angle and a second rotation angle based on the I-Q data pair, using a phase computation circuit; and generating a three-level modulated waveform having a lower negative level, a zero level and a higher positive level, based on the first rotation angle and the second rotation angle, using a single tri-level digital-to-time converter (DTC).

Example 24 is a modulation method including the subject matter of example 23, further comprising generating a radio frequency (RF) signal that has amplitude and phase modulation based on amplifying the three-level modulated waveform, using a power amplifier circuit.

Example 25 is a modulation method including the subject matter of examples 23-24, including or omitting elements, wherein generating the three-level modulated waveform further comprises determining a position of a center point of the zero level and determining a width of the zero level based on the first rotation angle and the second rotation angle, respectively.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. An apparatus adapted for a modulation scheme in a wireless communication device, comprising:
   a phase computation circuit configured to, receive a complex baseband signal comprising an in-phase signal and a quadrature signal forming an I-Q data pair, and determine a first rotation angle and a second rotation angle based on the I-Q data pair; and a modulation circuit coupled to the phase computation circuit, and configured to generate a three-level modulated waveform comprising a lower negative level, a zero level and a higher positive level, based on the first rotation angle and the second rotation angle.

2. The apparatus of claim 1, wherein the modulation circuit comprises a single tri-level digital-to-time converter (DTC) configured to generate the three-level modulated waveform.

3. The apparatus of claim 2, wherein the modulation circuit further comprises a local oscillator coupled to the single tri-level DTC and configured to generate an unmodulated square waveform.

4. The apparatus of claim 3, wherein the single tri-level DTC is configured to generate the three-level modulated waveform by modulating the unmodulated square waveform provided by the local oscillator.

5. The apparatus of claim 4, wherein the three-level modulated waveform comprises a radio frequency signal.

6. The apparatus of claim 1, wherein the modulation circuit is configured to generate the three-level modulated waveform by determining a position of a center point of the zero level and determining a width of the zero level, based on the first rotation angle and the second rotation angle, respectively.

7. The apparatus of claim 6, wherein the modulation circuit is configured to determine the position of the center point of the zero level based on the first rotation angle, and determine the width of the zero level based on the second rotation angle.

8. A modulation method, comprising:

receiving a complex baseband signal comprising an in-phase signal and a quadrature signal forming an I-Q data pair at a phase computation circuit, determining a first rotation angle and a second rotation angle based on the I-Q data pair, using the phase computation circuit; and generating a three-level modulated waveform comprising a lower negative level, a zero level and a higher positive level, based on the first rotation angle and the second rotation angle, using a modulation circuit.

9. The method of claim 8, wherein generating the three-level modulated waveform comprises determining a position of a center point of the zero level and determining a width of the zero level, based on the first rotation angle and the second rotation angle, respectively.

10. The method of claim 8, wherein generating the determined three-level modulated waveform comprises modulating an unmodulated square waveform from a local oscillator within the modulation circuit.

11. A transmitter adapted for a modulation scheme in a wireless communication device, the transmitter comprising:

a phase computation circuit configured to, receive a complex baseband signal comprising an in-phase signal and a quadrature signal forming an I-Q data pair, and determine a first rotation angle and a second rotation angle based on the I-Q data pair; and a digital-to-time converter (DTC) circuit comprising a single tri-level DTC coupled to the phase computation circuit and configured to generate a three-level modulated waveform comprising a lower negative level, a zero level and a higher positive level, based on the first rotation angle and the second rotation angle.

12. The transmitter of claim 11, wherein the DTC circuit further comprises a local oscillator coupled to the single tri-level DTC and configured to generate an unmodulated square waveform.

13. The transmitter of claim 12, wherein the single tri-level DTC is configured to generate the three-level modulated square waveform by modulating the unmodulated square waveform, wherein a position of a transition between the lower negative level and the zero level, and a position of a transition between the zero level and the higher positive level are defined by the first rotation angle and the second rotation angle.

14. The transmitter of claim 12, wherein the single tri-level DTC comprises a tri-level phase modulator circuit comprising a cascade of inverters configured to, receive the unmodulated square waveform from the local oscillator, and the first rotation angle and the second rotation angle from the phase computation circuit, and generate the three-level modulated waveform by taking output from one or more inverters of the cascade of inverters that gives a predetermined delay based on the first rotation angle and the second rotation angle.

15. The transmitter of claim 14, wherein the single tri-level DTC further comprises a mixer circuit coupled to the tri-level phase modulator circuit configured to generate a multiplication of the three-level modulated waveform with a constant current signal to generate a radio frequency (RF) signal for transmission.

16. The transmitter of claim 12, wherein the single tri-level DTC comprises a two-bit digital-to-analog converter (DAC) with two current sources configured to generate three different current levels at delayed time intervals from one another, in accordance with an input signal based on the first rotation angle and the second rotation angle.

17. The transmitter of claim 12, wherein the single tri-level DTC further comprises a tri-level phase modulator circuit coupled to the DAC, and configured to receive the first rotation angle and the second rotation angle from the phase computation circuit and generate the input signal to be provided to the DAC.

18. The transmitter of claim 12, wherein the single tri-level DTC comprises, a processing circuit comprising a cascade of inverters configured to generate a first square waveform having a first phase shift and a second square waveform having a second, different phase shift based on the first rotation angle and the second rotation angle, wherein the first square waveform and the second square waveform are generated by taking outputs from a first position and a second, different position of the cascade of inverters that gives the first phase shift and the second phase shift, respectively; and an inductor circuit comprising a pair of coupled inductors configured to receive the first square waveform and the second square waveform, and generate the three-level modulated waveform based thereon.

19. The transmitter of claim 11, wherein the first rotation angle and the second rotation angle are determined based on a first predetermined relation and a second predetermined relation, respectively, of the I-Q data pair.

20. The transmitter of claim 11, wherein the I-Q data pair defines an I-Q phasor in an I-Q constellation diagram having an I-Q phase angle associated therewith and the first rotation angle corresponds to the I-Q phase angle.

21. The transmitter of claim 20, wherein the complex baseband signal is further defined by a first constant amplitude phase modulated phasor and a second constant amplitude phase modulated phasor, and wherein the second rotation angle corresponds to an angle between the I-Q phasor and the first constant amplitude phase modulated phasor or the second constant amplitude phase modulated phasor.

22. The transmitter of claim 11, wherein a center point of the zero level of the three-level modulated waveform is defined by the first rotation angle and a width of the zero level is defined by the second rotation angle.

23. A modulation method, comprising:
- receiving a complex baseband signal comprising an in-phase signal and a quadrature signal forming an I-Q data pair, and determining a first rotation angle and a second rotation angle based on the I-Q data pair, using a phase computation circuit; and
- generating a three-level modulated waveform comprising a lower negative level, a zero level and a higher positive level, based on the first rotation angle and the second rotation angle, using a single tri-level digital-to-time converter (DTC).

24. The method of claim 23, further comprising generating a radio frequency (RF) signal that has amplitude and phase modulation based on amplifying the three-level modulated waveform, using a power amplifier circuit.

25. The method of claim 23, wherein generating the three-level modulated waveform further comprises determining a position of a center point of the zero level and determining a width of the zero level based on the first rotation angle and the second rotation angle, respectively.

* * * * *